US008935664B2

(12) United States Patent
Allam et al.

(10) Patent No.: US 8,935,664 B2
(45) Date of Patent: Jan. 13, 2015

(54) METHOD AND APPARATUS TO DETERMINE RULES IMPLEMENTATION DECISION

(75) Inventors: Abdul Allam, Raleigh, NC (US); Jaime Macbeth Gonzalez Lojero, Tlaquepaque (MX); Rafael Arriaga Lara, Mexico City (MX)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 13/253,285

(22) Filed: Oct. 5, 2011

(65) Prior Publication Data

US 2013/0091078 A1 Apr. 11, 2013

(51) Int. Cl.
*G06F 9/44* (2006.01)
*G06Q 10/06* (2012.01)

(52) U.S. Cl.
CPC .............. *G06Q 10/0633* (2013.01); *G06F 8/20* (2013.01); *G06Q 10/067* (2013.01)
USPC ............. 717/117; 717/100; 717/102; 706/11; 706/12; 706/20; 706/46

(58) Field of Classification Search
CPC combination set(s) only.
See application file for complete search history.

(56) References Cited

U.S. PATENT DOCUMENTS

| | | | | |
|---|---|---|---|---|
| 6,775,658 | B1 * | 8/2004 | Zothner | 706/47 |
| 7,805,330 | B2 | 9/2010 | Johnson et al. | |
| 8,200,527 | B1 * | 6/2012 | Thompson et al. | 705/7.39 |
| 8,271,407 | B2 * | 9/2012 | Ristow et al. | 706/12 |
| 2006/0112061 | A1 * | 5/2006 | Masurkar | 706/47 |
| 2006/0282886 | A1 * | 12/2006 | Gaug | 726/5 |
| 2007/0233628 | A1 * | 10/2007 | Sherwood et al. | 706/46 |
| 2008/0172654 | A1 * | 7/2008 | Frohlich et al. | 717/127 |
| 2008/0313595 | A1 * | 12/2008 | Boulineau et al. | 717/101 |
| 2009/0076884 | A1 * | 3/2009 | Johnson et al. | 705/10 |
| 2009/0281996 | A1 * | 11/2009 | Liu et al. | 707/3 |
| 2009/0307298 | A1 | 12/2009 | Jaiswal et al. | |
| 2010/0077032 | A1 * | 3/2010 | Drennan et al. | 709/206 |

(Continued)

FOREIGN PATENT DOCUMENTS

EP    2 154 628 A2    2/2010

OTHER PUBLICATIONS

James Taylor and Neil Raden, Smart (Enough) Systems: How to Deliver Competitive Advantage by Automating the Decisions Hidden in Your Business, 2007, Prentice Hall Press, Upper Saddle River, NJ, http://portal.acm.org/citation.cfm?id=1406154, Abstract, pp. 1-2.

(Continued)

*Primary Examiner* — Chameli Das
(74) *Attorney, Agent, or Firm* — George R. McGuire; John Pivnichny; Bond Schoeneck & King, PLLC

(57) ABSTRACT

A technique and associated mechanism that guides the user through a set of questions relating to operation rules used in the design of Service Oriented Architecture Systems (SOAs). The questions are related to key aspects of a solution—security, maintenance frequency, usage demand/performance and complexity. Preferably, the questions are yes-or-no questions. Based on the answers provided, an appropriate path will be selected categorize into an appropriate category. The category of the rule will require, or at least suggest, the SOA component into which the rule will be implemented when it is implemented by the SOA designer. the technique is technology specific agnostic and helps in selecting an appropriate tool/platform in a standard and consistent manner.

20 Claims, 7 Drawing Sheets

(56) References Cited

U.S. PATENT DOCUMENTS

| | | | |
|---|---|---|---|
| 2010/0088256 A1* | 4/2010 | Ristow et al. | 706/12 |
| 2010/0138368 A1* | 6/2010 | Stundner et al. | 706/12 |
| 2010/0281355 A1* | 11/2010 | White et al. | 715/222 |
| 2010/0312737 A1 | 12/2010 | Coldicott et al. | |
| 2011/0145279 A1* | 6/2011 | Chunilal | 707/769 |
| 2012/0143812 A1* | 6/2012 | Proctor et al. | 706/48 |
| 2012/0144363 A1* | 6/2012 | Bernardini et al. | 717/101 |
| 2012/0290702 A1* | 11/2012 | Vincent | 709/223 |
| 2012/0311519 A1* | 12/2012 | Kennaley | 717/101 |
| 2013/0046661 A1* | 2/2013 | Levin | 705/30 |
| 2013/0138704 A1* | 5/2013 | Grateau et al. | 707/821 |
| 2013/0246049 A1* | 9/2013 | Mirhaji | 704/9 |
| 2014/0109037 A1* | 4/2014 | Ouali | 717/105 |

OTHER PUBLICATIONS

Ali Arsanjani, et al., Design An SOA Solution Using a Reference Architecture, Mar. 28, 2007, p. 8, http://www.ibm.com/developerworks/library/ar-archtemp/.

The Open Group, SOA Reference Architecture, Draft 10, Draft Technical Standard 2009, p. 9, http:www. opengroup.org/projects/soa-ref-arch/uploads/40/19713/soa-ra-public-050609.pdf.

* cited by examiner

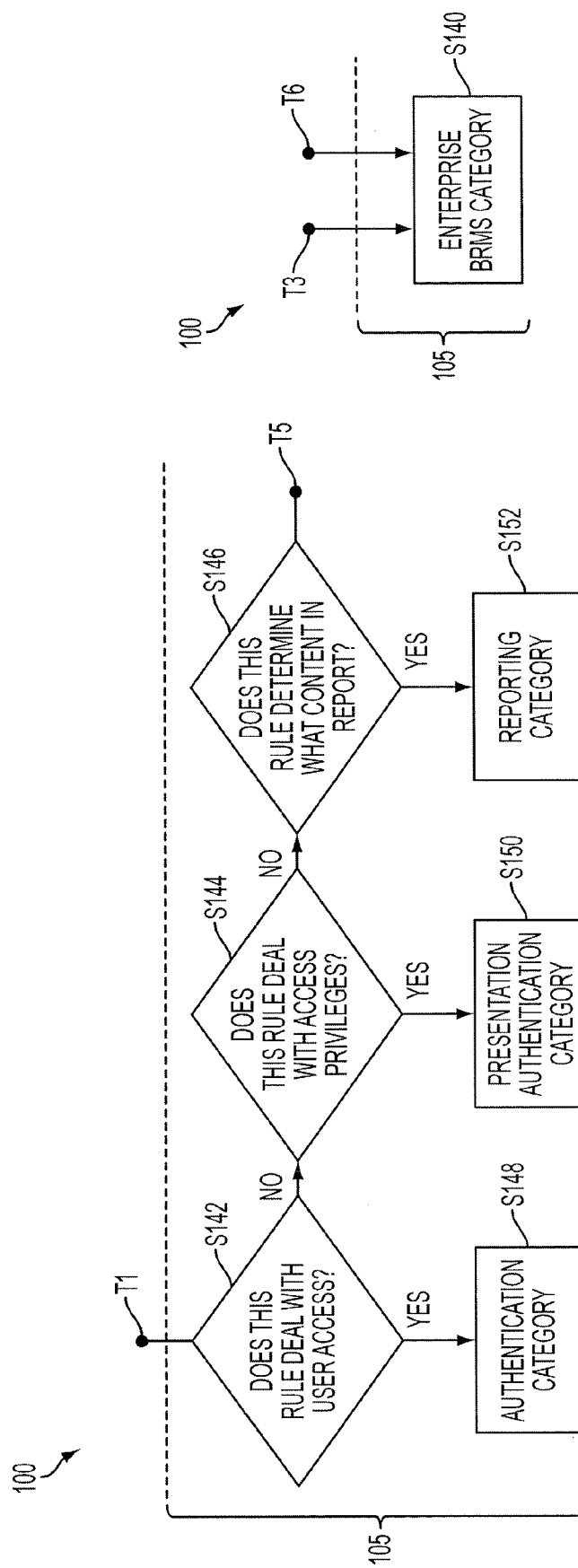

METHOD AND APPARATUS TO DETERMINE RULES IMPLEMENTATION DECISION

BACKGROUND

1. Field of the Invention

The present invention relates to tools and techniques for designing Service Oriented Architecture systems (SOAs) and more particularly to tools and techniques for implementing rules in SOAs that are being designed or modified in their design.

2. Description of the Related Art

SOAs are known. various components of SOAs are known, such as: user interface (UI), rules engines, process flow engine, database system, reporting system, application servers, etc.

Tools for designing SOAs are known. One such tool is called SOMA-ME (Service-Oriented Modeling and Architecture-Modeling Environment) which was created by IBM to help designers design SOAs. It is known that SOAs make heavy use of "SOA operational rules" in their operation. One choice that an SOA designer will routinely make is the choice of which tool or platform (herein collectively called "tool/platform") that will be used to implement a given SOA operational rule that is to be included in an SOA. The decision of which tool/platform to use to implement a given SOA operational rule will herein be referred to as the "tool/platform decision." It is known that when the tool/platform decision is made in an inappropriate way, this can cause problems in one or more of the following areas: maintenance, service performance and/or solution performance.

BRIEF SUMMARY

The idea of a formal classification system for classifying SOA operational rules may not be known. Whether a classification system for classifying SOA rules is, or is not, "prior art" to the present invention, it is a fundamental idea that should be understood before understanding what the present invention is and how it works. The idea is that SOA operational rules can be placed into categories based upon how they are most preferably implemented. In a simple example, a single layer of mutually exclusive categories is set up based primarily upon the SOA component into which each subject rule is implemented. As a more specific example, the categories for the SOA operational rules might be as follows: (i) uncategorized rules; (ii) presentation validation component; (iii) workflow process component; (iv) dynamic end point selection component; (v) database component; (vi) local business rule management system (BRMS) component; (vii) enterprise BRMS component (viii) authentication component; (ix) presentation authorization component; (x) reporting component; and (xi) invalid rules. Other systems of categorization for SOA operational rules may be possible, whether or not based primarily upon SOA system components as in the foregoing example. In these systems of categorization, the categories may or may not be mutually exclusive (that is, a rule might be able to be in more than one category at the same time in some systems). It may be possible to categorize the rules hierarchically, with multiple layers of classification.

One aspect of the present invention is directed to a method and apparatus for assigning SOA operational rules to categories of an SOA operational rule classification scheme based upon a question-based algorithm. When performed on a given SOA operational rule, the question-based algorithm presents a plurality of questions to the user, with the answers to the questions used as a basis to assign a category (or categories) to that given SOA operation rule. In some preferred embodiments, the categories of the classification scheme respectively refer to tool/platform implementation options. In this way, the category (or categories) for the given SOA operational rule can be used to help SOA designers make the appropriate tool/platform decision. In some embodiments, the user (that is, generally, the designer) will be able to view SOA operational rules broken down by category, which may also be helpful in making tool/platform decisions.

This invention presents a novel technique and algorithm to evaluate rules based on answer provided to specified set of questions. Based on the answers the system will navigate through the next set of questions and decision points. This allows rules to be analyzed and categorized in an automated fashion and in a consistent manner across the project that could involve multiple teams working in parallel. The invention proposes an algorithm that can be used by the inference engine and also shows how existing IBM toll like SOMA ME can integrate this capability.

Various embodiments of the present invention may exhibit one or more of the following objects, features and/or advantages:

(i) improved tool/platform decisions;
(ii) easier maintenance of SOAs;
(iii) improved system performance for SOAs; and/or
(iv) improved solution performance for SOAs;
(v) Provides a mechanism that guides a user through questions that addresses all key aspects of a solution—security, maintainability, performance, and complexity;
(vi) Based on the response received, it provides a recommended implementation decision which is product/vendor agnostic;
(vii) Can be applied consistently across a project by team members involved with various architectural layers e.g. Presentation layer, Data Access Layer, Business Process layer, Integration layer, etc.;
(viii) Facilitates verification and validation of rules implementation decision;
(ix) Ensures placement of rules in the right platform/tool;
(x) This mechanism can be automated as a plug-in to standard modeling tools such as WebSphere Business Process Modeler, SOMA-ME (Service Oriented Modeling Architecture-Modeling Environment), etc.

BRIEF DESCRIPTION OF SEVERAL VIEWS OF THE DRAWINGS

The present invention will be more fully understood and appreciated by reading the following Detailed Description in conjunction with the accompanying drawings, in which:

FIGS. 2A, 2B, 2C, 2D and 2E are each a portion of a flowchart of a first embodiment of a method according to the present invention;

FIG. 3 is a screenshot used in the first embodiment method;

DETAILED DESCRIPTION

Figure 1:
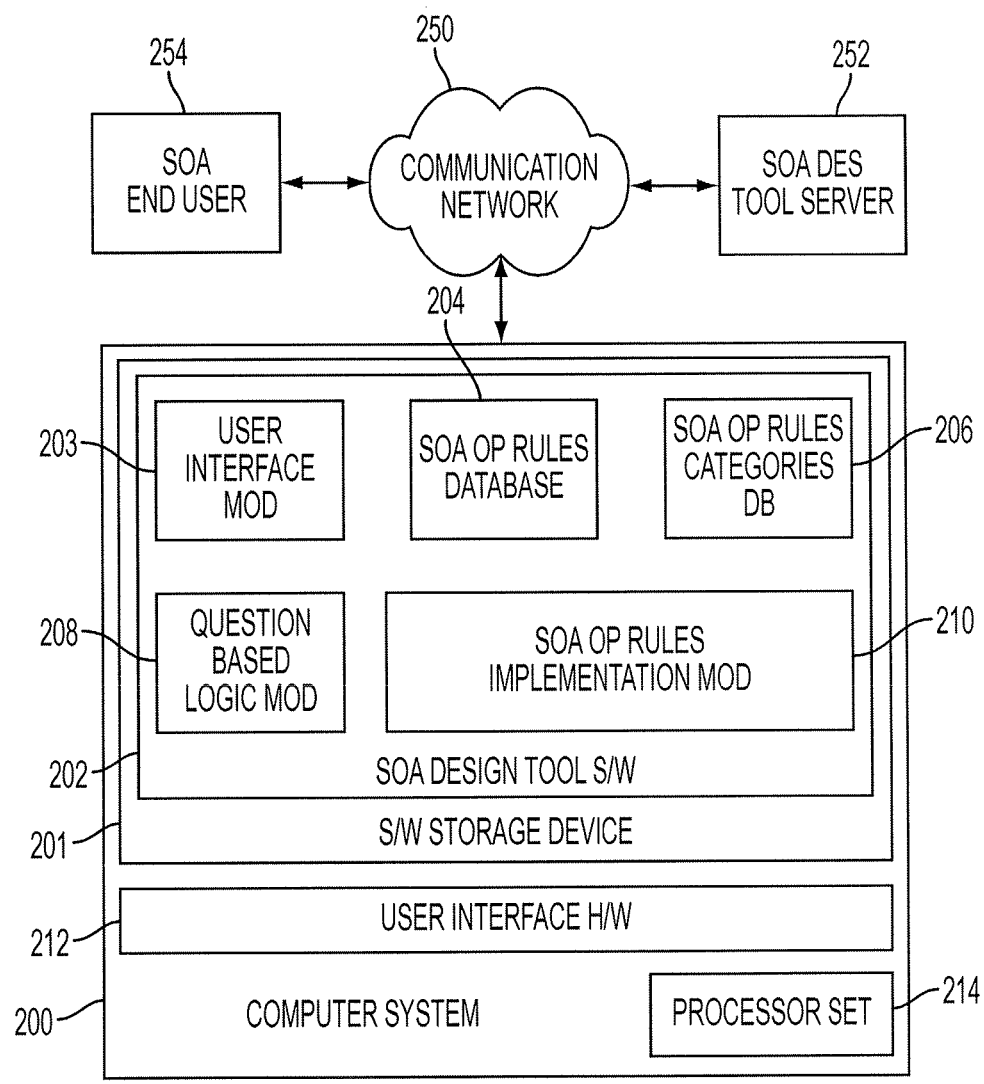
FIG. 1 is a schematic view of a first embodiment of a computer system according to the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, an electronic, magnetic, optical, electromagnetic, infrared, or semiconductor system, apparatus, or device, or any suitable combination of the foregoing. More specific examples of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows computer system 200 according to the present invention. Computer system 200 includes: software storage device (see DEFINITIONS section) 201; user interface hardware 212; processor set 214; communication network 250; SOA design tool server 252; and SOA end user computer 254. Computer system 200 may take the form of a standalone computer, or it may take the form of multiple pieces of computer hardware that are in data communication (see DEFINITIONS section) with each other, such as a wide area network system or a local area network system. Software storage device 201 includes: user interface module (see DEFINITIONS section) 203; SOA operational rules database 204; SOA operational rules categories database 206; question-based logic module 208; SOA operational rules implementation module. SOA design tool software 201 was received as a computer program product from server 252 through communication network 250. The SOA end user can use the SOA software designed by the computer program product of the present invention on machine 254 through communication network 250.

As noted above, software in the form of a design tool for designing SOAs are known (for example, SOMA-ME). With respect to modules 203, 204 and 210, known SOA design software would include: (i) some type of user interface module for exchanging data with a user, such as a human user; (ii) some type of SOA operational rules database for storing defined SOA operational rules; (iii) some type of SOA operation rules database so that a user could implement a given, desired SOA operational rule after a tool/platform decision has been made for a given implementation of a given rule.

The present invention focuses on the SOA operational rules categories database 206 and especially on the question-based logic module 208. Question-based logic module guides the user through a series of questions, for a given SOA operational rule, so that given SOA operational rule can be assigned into an appropriate SOA operational rules category. SOA operational rules categories database 206 stores these assignments of rules to categories so that the user can be informed of which rule a category belongs to on an on-going, as-helpful basis through user interface module 203 and user interface hardware 212, especially when the user (that is, the SOA designer) will be making a tool/platform decision as she implements a given SOA operation rule into an SOA under design and/or modification (initial SOA design and modification to existing SOA designs will herein collectively be referred to as "SOA design"). In many embodiments the user will be a human, but there may be embodiments where at least some decisions made by the user (such as, answers to questions, tool/platform decisions) may be made by artificial intelligence devices.

It is further noted that while SOA operational rules database 204 and SOA operational rules categories database 206 have been set forth and described as separate modules, for purposes of conceptual clarity in understanding the present invention, the data of these two databases may be physically and/or logically intermingled so that one of ordinary skill might consider them as a single database. Also, the word "database" here generally means any set of data that is stored on and accessible from a software storage device—no particular data structure (now known or to be developed in the future) is necessarily implied herein by the use of the term "database."

Figure 4:
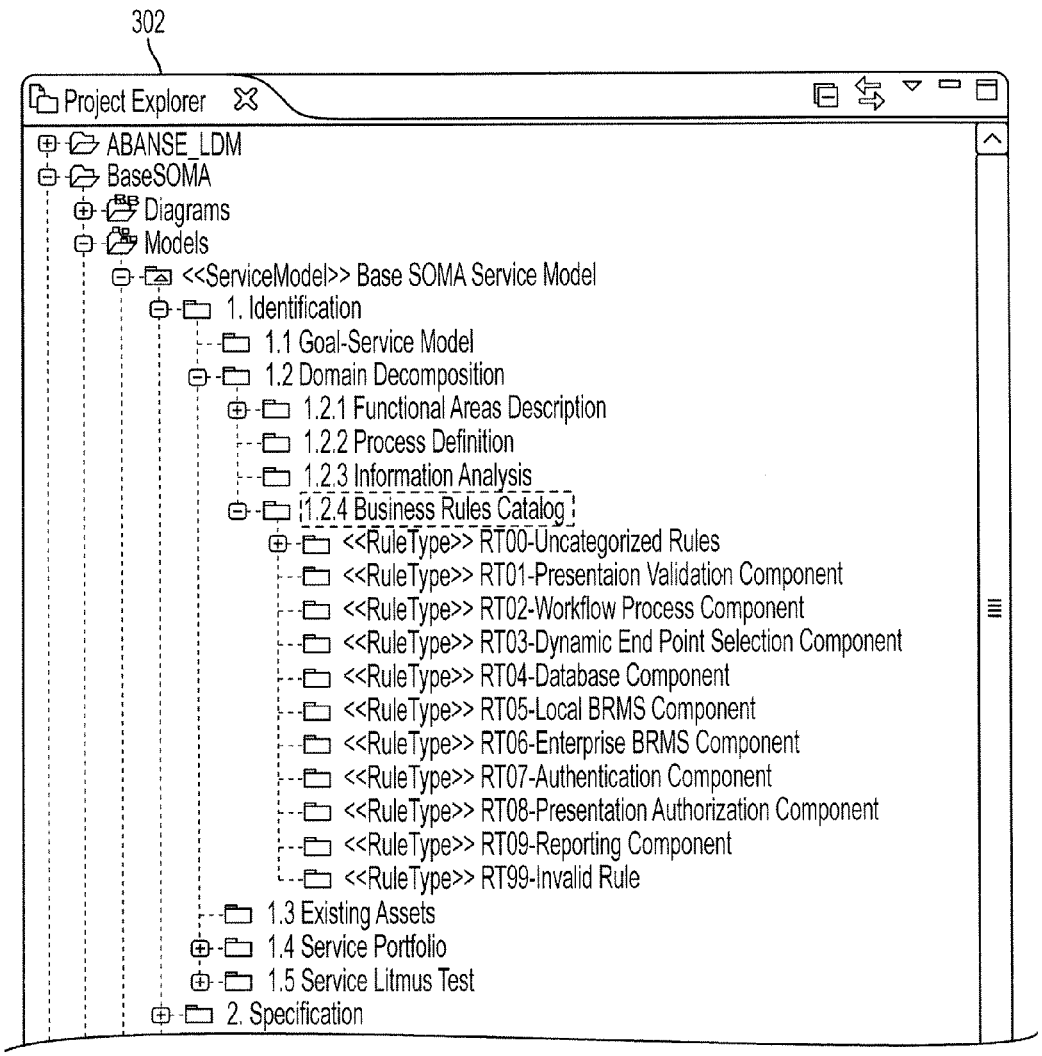
FIG. 4 is another screenshot used in the first embodiment method.
Figure 5:
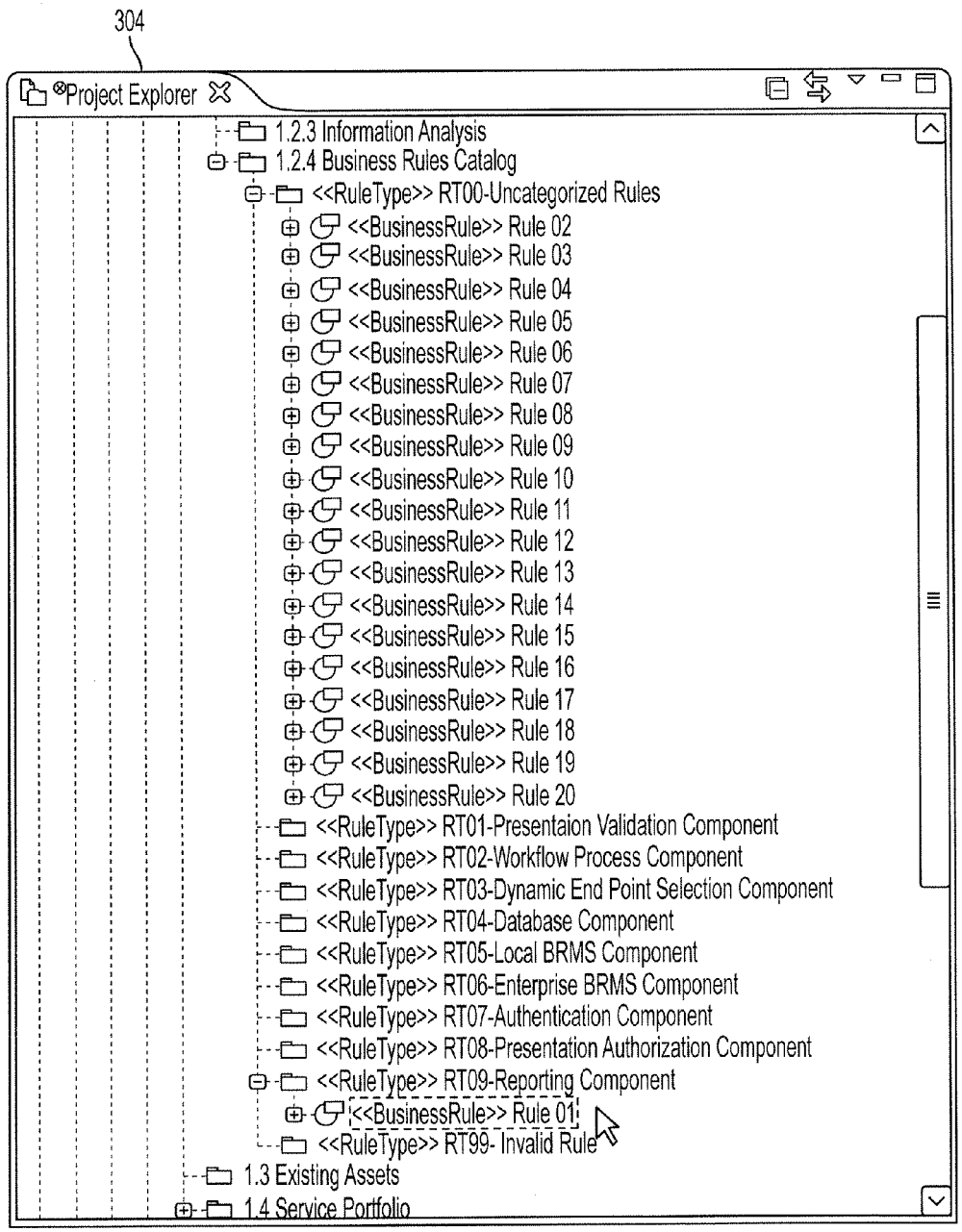
FIG. 5 is another screenshot used in the first embodiment method.

Now that the computer system 200 has been discussed generally, the operation of the question-based logic module and SOA operational rules categories database 206 will be described with reference to FIGS. 2A, 2B, 2C, 2D, 2E, 3, 4 and 5. As shown in FIGS. 2A to 2E includes: terminals T1, T2, T3, T4, T5, T6 (used to shown process flow connections between the various Figures); security processing step level 101; maintenance frequency/usage demand processing step level 102; complexity processing level 103; rule type processing step level 104; implementation decision (or tool/platform decision) processing step level 105; and process steps S110, S112, S114, S116, S118, S129, S122, S124, S126, S128, S130, S132, S132, S134, S136, S138, S140, S142, S144, S146, S148, S150 and S152. In FIGS. 2A to 2D, the processing step level corresponding to the various steps is shown schematically. FIGS. 3, 4 and 5 respectively show: first screen shot 300, second screen shot 302; and third screen shot 304.

Figure 2A:
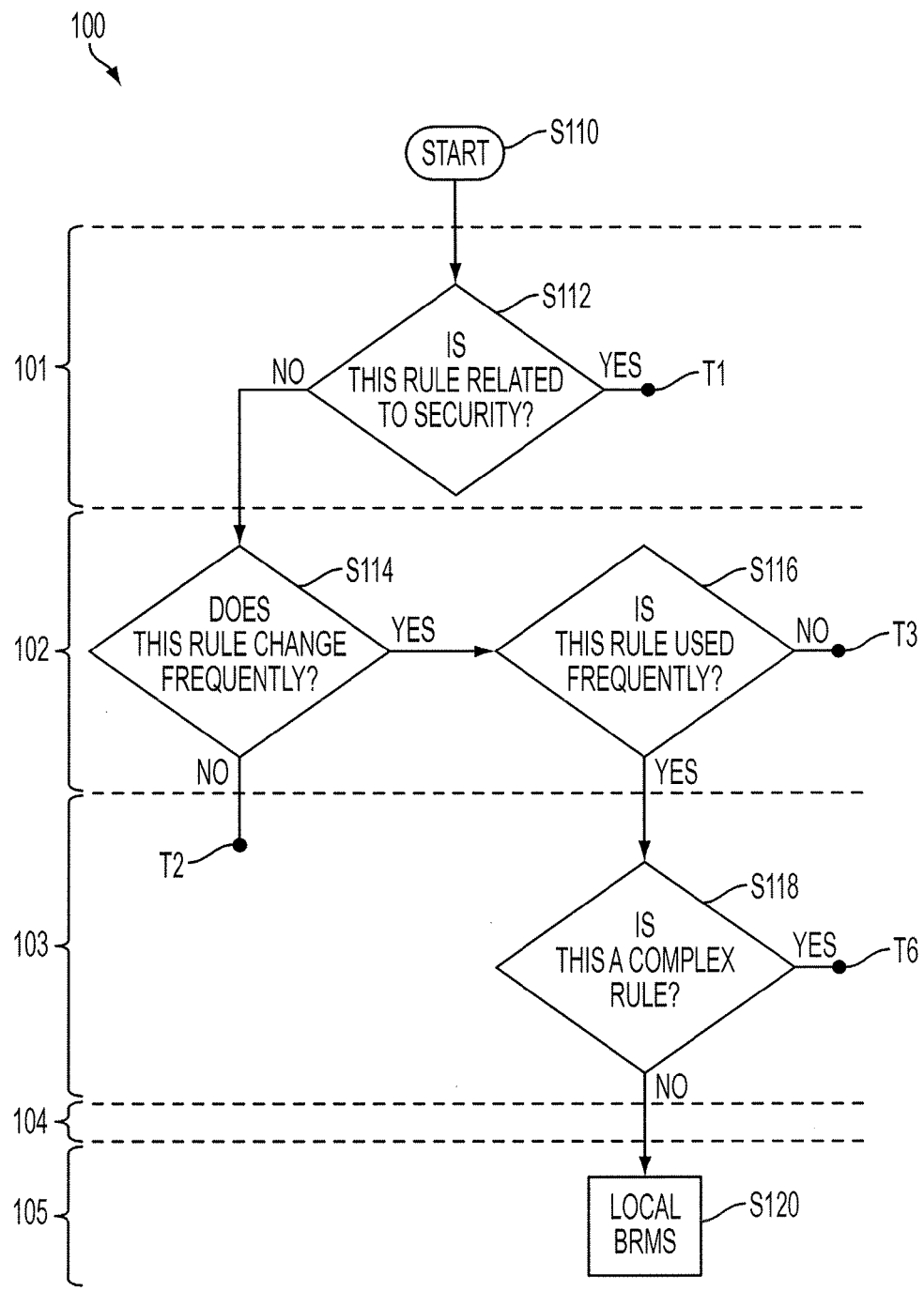

As shown in FIG. 2A, processing starts at step S110 and proceeds to step S112. At step S112, the user decides whether the rule is related to security. An example of a screen display for allowing a user to make this decision is shown in FIG. 3 at the Q1 line of first screenshot 300 (in this example, the user has indicated that the rule under analysis does, indeed, relate to security. Moving back to FIG. 2A, at step S112: (i) a no decision leads to step S114; and (ii) a yes decision leads to terminal T1. At step S114, the user decides whether the rule is one that will change frequently (for example, if the rule is expected to last less than 6 months). At step S114: (i) a no decision leads to terminal T2; and (ii) a yes decision leads to step S116. At step S116, the user decides whether the rule is going to be used frequently. At step S116: (i) a no decision leads to terminal T3; and (ii) a yes decision leads to step S118. At step S118, the user decides whether the rule is complex (for example, nested if-then-else constructs are a strong indication that a rule is complex). Performance of the rule is the primary concern, in this context, and maintenance of the rule is secondary. At step S118: (i) a no decision leads to step S120; and (ii) a yes decision leads to terminal T6.

At step S120, SOA operational rules categories database 206 is modified to indicate that the rule under analysis is in the local BRMS category of rules and analysis ends. Presumably, when the designer goes to implement that particular rule using SOA rules implementation module 210, the designer will implement each instance of the rule in the local BRMS component. Whether the SOA design tool software allows the designer to implement the rule in any other way is a matter of software design choice. It should also be noted that in this example, the rule was automatically placed into the indicated SOA operational rules category by question-based logic module 208. This may not be true of all embodiments of the present invention. For example, some embodiments may merely recommend the designer to place the rule in the determined category, while still allowing the user to alternatively (or additionally) place the given rule into other categories. Again, this is a matter of design choice for the SOA design tool software.

Figure 2B:
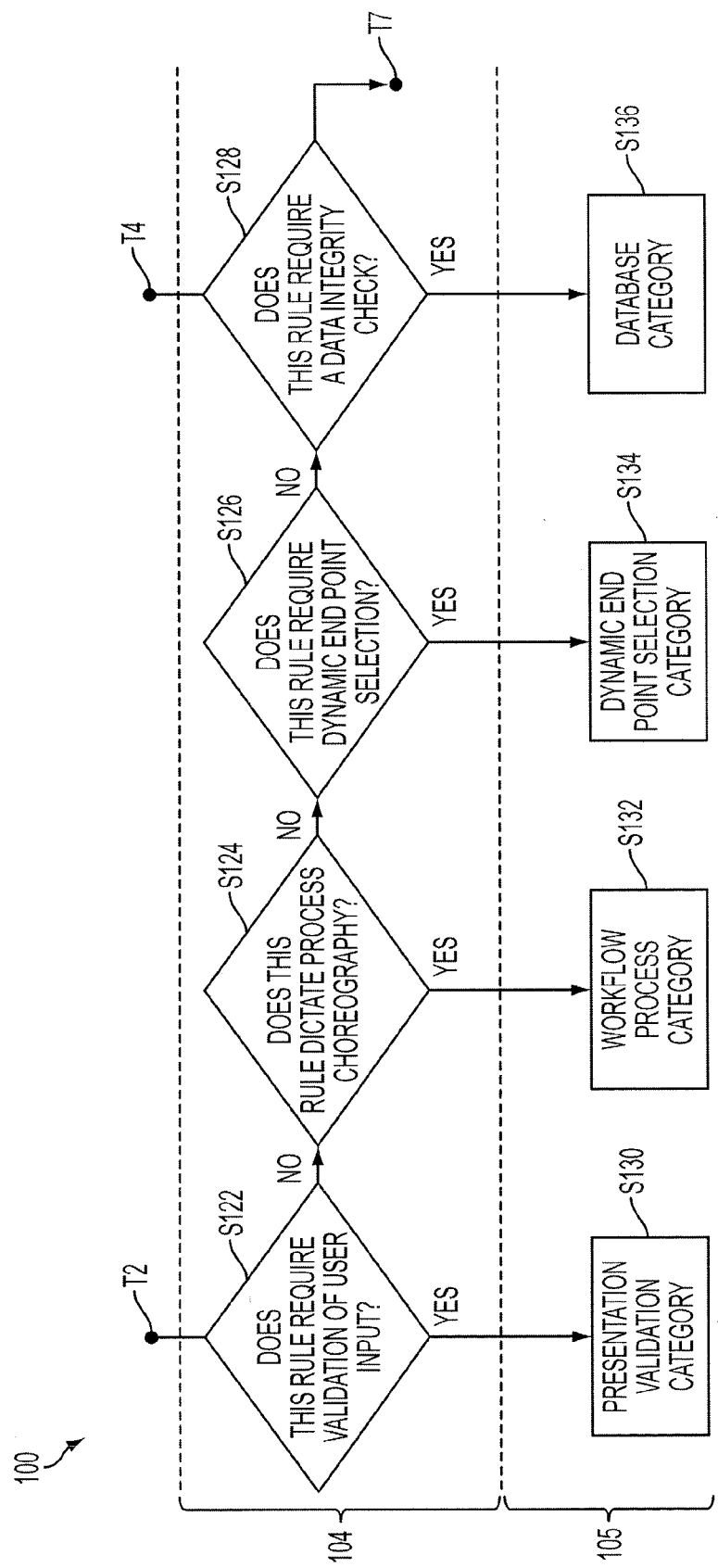
Figures 2E, 3:
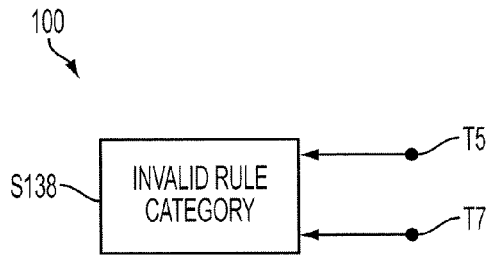

As shown in FIG. 2B, process flow from terminal T2 (as described above, flows to step S122. At step S122, the user decides whether the rule is one that requires validation of user input. At step S122: (i) a no decision leads to step S124; and (ii) a yes decision leads to step S130. At step S130, SOA operational rules categories database 206 is modified to indicate that the rule under analysis is in the presentation validation category of rules (or Presentation Layer Validation—JSF (Java Server Face)) and analysis ends. At step S124, the user decides whether the rule dictates process choreography (for example, process flow). At step S124: (i) a no decision leads to step S126; and (ii) a yes decision leads to step S132. At step S132, SOA operational rules categories database 206 is modified to indicate that the rule under analysis is in the workflow process category of rules and analysis ends. At step S126, the user decides whether the rule requires dynamic endpoint selection, that is, select service end point based on type of customer, etc. At step S126: (i) a no decision leads to step S128; and (ii) a yes decision leads to step S134. At step S134, SOA operational rules categories database 206 is modified to indicate that the rule under analysis is in the dynamic endpoint selection category of rules and analysis ends. At step S128, the user decides whether the rule is one that requires a data integrity check. At step S128: (i) a no decision leads to terminal T7; and (ii) a yes decision leads to step S136. At step S136, SOA operational rules categories database 206 is modified to indicate that the rule under analysis is in the database (or database system) category of rules and analysis ends.

As shown in FIG. 2C, process flow from terminal T1 (as described above, flows to step S142. At step S142, the user decides whether the rule is one that deals with the issue of user access. At step S142: (i) a no decision leads to step S144; and (ii) a yes decision leads to step S148. At step S148, SOA operational rules categories database 206 is modified to indicate that the rule under analysis is in the authentication (or authentication system) category of rules and analysis ends. At step S144, the user decides whether the rule deals with the issue of access privileges (for example, check access privileges and based on access privileges determine what can be displayed on the UI screen). At step S144: (i) a no decision leads to step S146; and (ii) a yes decision leads to step S150. At step S150, SOA operational rules categories database 206 is modified to indicate that the rule under analysis is in the presentation authorization (or Authorization System/Presentation Layer, e.g., JSF (Java Server Face)) category of rules and analysis ends. At step S146, the user decides whether the rule determines what content should be included in the report. At step S146: (i) a no decision leads to terminal T5; and (ii) a yes decision leads to step S152. At step S152, SOA operational rules categories database 206 is modified to indicate that the rule under analysis is in the reporting category of rules and analysis ends.

As shown in FIG. 2D, process flow from terminals T3 and T6 (as described above, both flow to step S140. At step S140, SOA operational rules categories database 206 is modified to indicate that the rule under analysis is in the enterprise BRMS category of rules and analysis ends. As shown in FIG. 2E, process flow from terminals T5 and T7 (as described above, both flow to step S138. At step S138, SOA operational rules categories database 206 is modified to indicate that the rule under analysis fits into the invalid rule category of rules (which is to say that none of the pre-existing categories of rules fits it) and analysis ends. The SOA design software may allow the designer to re-categorize the rule if new categories of rules are added to the SOA system under design and/or if the designer wants a chance to answer the questions of the question-based logic in a different way.

As shown in screenshot 300 of FIG. 3, the questions of the question-based logic may not be required to be answered in the order that they are presented to the designer. Although the above explanation of the flow chart was stated as if the user was answering the questions as the process flow of the flowchart was ongoing, in at least some embodiments, the user may answer all the questions about the rule under analysis before the process of the flow chart is undertaken (based on the previously-provided answers of the user).

As shown in FIG. 4, screenshot 302 shows the categories of rules as they might be presented to the designer during SOA design. As shown in FIG. 5, screen shot 304 shows how a designer can "expand" a desired category of rules to see which rules have been categorized, by the methods of the present invention, into that category. More specifically, the designer has expanded: (i) the not-yet-categorized category (where rules numbers 02 to 20 currently reside, in need of categorization); and (ii) the reporting category (where rule 01 happens to reside).

At least some embodiments of the present invention provide a user with a mechanism to determine the implementation approach/decision. In order to achieve this, first certain criteria is specified: (i) Security aspects—relating to user access or access privileges which may determine what can be presented or displayed on UI (user interface) screen; (ii) Maintenance frequency requirements—how often the rules change or need to be updated; (iii) Usage Demand—is the rule invoked a lot; (iv) Complexity of rule—does it have a single non-nested if-then-else construct (a simple rule) or multiple and nested if-then-else constructs (a complex rule). Based on the foregoing criteria, rule types are identified. These rule types are in the form of a question, as explained above in connections with FIGS. 1 to 3.

Some examples of the categorization of SOA operation rules according to the present invention will now be set forth:

(i) Rule: Maximum number of transaction items that a user can enter via UI screen is 10—after that do not allow user to enter any more transactions. Key question: Does this rule require validation of user input? Key Answer: Yes, check the limit allowed and disable (or grey out) the Add button on screen. Rule Category and Implementation Component: Presentation layer (UI) using JSF, JavaScript, etc.

(ii) Rule: When file is received check the file type, if the file type requires validation before sending then move to validation process activity if not move to send file process activity. Key question: Does this rule dictate process choreography? key Answer: Yes, depending on file type you select the activity to which to route. Rule category and Implementation Component: Workflow Process System.

(iii) Rule: All "Deposit type" transactions requests comes from Corporate Customer Line of Business (LOB) must be provided within 2 second response time. Key Question: Does this rule require dynamic endpoint selection? key Answer: Yes, in this case, at run time, the dynamic end selector will have to locate a service that satisfies the two second response time requirement for requests coming from a Corporate Customer (LOB). Rule category and Implementation Component: Dynamic Endpoint Selection System.

(iv) Rule: Check if the client has instructions to invest in a specific fund. If yes, then use this fund to invest, if not, select the fund based on the age of the client. Key Question: Does this rule get invoked a lot and is simple. Key Answer: Yes, this is rule is in demand and is simple complexity due as it has a simple condition. Performance is the primary consideration. Rule Category and Implementation Component: Local BRMS (Business rule management system).

(v) Rule: Based on the origin of the deposit (from: employer, personal or institutional) locate the customer A/C using the NSS, country population ID or both. If the customer is not found, then capture record in response file. If the customer is found, check if the customer account is in active state. If yes, then process deposit; else (that is, the account is not active) include record in the response file. Key Question: Does this rule get invoked a lot and is complex? Key Answer: Yes, this is complex because it has multiple and nested conditions. Complexity is primary concern and performance is secondary. Rule Category and Implementation Component: Enterprise BRMS.

(vi) Rule: Auto generate a unique package id by concatenating the control unit Id and consecutive transaction number. Key Question: Dose this rule require a data integrity check? Key Answer: Yes, it does as it has to deal with data integrity. Rule category and Implementation Component: Database System.

(vii) Rule: Display only those field on UI screen based on type of agent, external or internal. Key Question: Does this rule deal with access privileges. Key Answer: Yes, fields are displayed based on access privileges. Rule category and Implementation Component: Authorization System and Presentation Layer Script—JSF, JavaScript, etc.

This flow can be implemented as an algorithm in an inference engine. The logic of the inference engine to perform analysis and evaluation of rules is provided below.

```
Select all identified rules for evaluation
    for each rule selected {
        set the evaluation level to 1
        set rule type to 0 (uncategorized rule)
    }
    for each rule selected {
        evaluate Question-1 (is this rule related to security?)
        if (Q1=true)
            set evaluation level to 4b
        else
            set evaluation level to 2
    }
    for each rule in evaluation level = 2{
        evaluate Question-2 (Does this rule change frequently?)
        if (Q2=true)
            evaluate Question-3 (Is this rule in demand / invoked a lot?)
            if (Q3=true)
                set evaluation level to 3 else
                set rule type to 5
                set evaluation level to 5
        else
            set evaluation level to 4a
    }
    for each rule in evaluation level = 3{
        evaluate Question-4 (Is this a complex rule?)
        if (Q4=true)
            set rule type to 5
            set evaluation level to 5 else
            set rule type to 4
            set evaluation level to 5
    }
```

```
for each rule in evaluation level = 4a {
    evaluate Question-5 (Does this rule require validation of user input?)
    if (Q5=true)
        set rule type to 1
        set evaluation level to 5 else
        evaluate Question-6 (Does this rule dictate the process
        choreography?)
        if (Q6=true)
            set rule type to 2
            set evaluation level to 5
        else
            evaluate Question-7 (Does this rule require dynamic
            endpoint selection?)
            if (Q7=true)
                set rule type to 3
                set evaluation level to 5
            else
                evaluate Question-8 (Does this rule require data
                integrity check?)
                if (Q8=true)
                    set rule type to 6
                    set evaluation level to 5
                else
                    set rule type to 99 remark this rule is invalid
                    set evaluation level to 5
}
for each rule in evaluation level = 4b {
    evaluate Question-9 (Does this rule deal with user access?)
    if (Q9=true)
        set rule type to 7
        set evaluation level to 5 else
        evaluate Question-10 (Does this rule deal with access
        privileges?)
        if (Q10=true)
            set rule type to 8
            set evaluation level to 5
        else
            evaluate Question-11 (Does this rule determine what
content should be included in the report?)
            if (Q11=true)
                set rule type to 9
                    set evaluation level to 5
                else
                    set rule type to 99 remark this rule is
                    invalid set evaluation level to 5
```

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

DEFINITIONS

Any and all published documents mentioned herein shall be considered to be incorporated by reference, in their respective entireties. The following definitions are provided for claim construction purposes:

Present invention: means "at least some embodiments of the present invention," and the use of the term "present invention" in connection with some feature described herein shall not mean that all claimed embodiments (see DEFINITIONS section) include the referenced feature(s).

Embodiment: a machine, manufacture, system, method, process and/or composition that may (not must) be within the scope of a present or future patent claim of this patent document; often, an "embodiment" will be within the scope of at least some of the originally filed claims and will also end up being within the scope of at least some of the claims as issued (after the claims have been developed through the process of patent prosecution), but this is not necessarily always the case; for example, an "embodiment" might be covered by neither the originally filed claims, nor the claims as issued, despite the description of the "embodiment" as an "embodiment."

First, second, third, etc. ("ordinals"): Unless otherwise noted, ordinals only serve to distinguish or identify (e.g., various members of a group); the mere use of ordinals shall not be taken to necessarily imply order (for example, time order, space order).

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (ii) in a single proximity within a larger piece of software code; (iii) located within a single piece of software code; (iv) located in a single storage device, memory or medium; (v) mechanically connected; (vi) electrically connected; and/or (vii) connected in data communication.

Software storage device: any device (or set of devices) capable of storing computer code in a non-transient manner in one or more tangible storage medium(s); "software storage device" does not include any device that stores computer code only as a signal.

Unless otherwise explicitly provided in the claim language, steps in method or process claims need only be performed that they happen to be set forth in the claim only to the extent that impossibility or extreme feasibility problems dictate that the recited step order be used. This broad interpretation with respect to step order is to be used regardless of alternative time ordering (that is, time ordering of the claimed steps that is different than the order of recitation in the claim) is particularly mentioned or discussed in this document. Any step order discussed in the above specification, and/or based upon order of step recitation in a claim, shall be considered as required by a method claim only if: (i) the step order is explicitly set forth in the words of the method claim itself; and/or (ii) it would be substantially impossible to perform the method in a different order. Unless otherwise specified in the method claims themselves, steps may be performed simultaneously or in any sort of temporally overlapping manner. Also, when any sort of time ordering is explicitly set forth in a method claim, the time ordering claim language shall not be taken as an implicit limitation on whether claimed steps are immediately consecutive in time, or as an implicit limitation against intervening steps.

What is claimed is:

1. A method of designing a service oriented architecture ("SOA") system using a computer system that includes software stored on a software storage device, the method comprising the steps of:
    defining a SOA operational rule and a plurality of SOA operational rule categories;
    presenting to a user, through the computer system, a plurality of questions included in the software stored on the software storage device with regard to the SOA operational rule, wherein at least one question of the plurality of questions comprises whether the SOA operational rule changes frequently;
    receiving, through the computer system, a plurality of answers from the user respectively in response to the plurality of questions;
    categorizing, by the software, the SOA operational rule into at least a SOA operational rule category, from the plurality of SOA operational rule categories, based at least in part upon answers given at the answering step, wherein when an answer is false to the question comprising whether the SOA operational rule changes frequently, a question comprising whether the SOA operational rule requires validation of user input is presented to the user prior to the step of categorizing, and wherein when an answer is true to the question comprising whether the SOA operational rule changes frequently, a question comprising whether the SOA operational rule is used frequently is presented to the user prior to the step of categorizing; and
    storing, on the software storage device, information indicating that the SOA operational rule is associated with at least the SOA operational rule category.

2. The method of claim 1 wherein the answering step is performed, at least in part, by a human user.

3. The method of claim 1 wherein, at the categorizing step, the SOA operational rule is categorized into at least the SOA operational rule category, from the plurality of SOA operational rule categories, based exclusively upon answers given at the answering step.

4. The method of claim 1 wherein, at the categorizing step, the SOA operational rule can be and is categorized into only one applicable SOA operational rule category.

5. The method of claim 1 wherein each of the plurality of SOA operational rule categories respectively corresponds to an SOA component into which rules may be implemented.

6. The method of claim 5 further comprising the step of implementing the SOA operational rule into an SOA system where a component of the SOA system into which the SOA operational rule is implemented is chosen to correspond to the SOA operational rule category.

7. The method of claim 5 wherein the SOA operational categories include the following: local business rule management system ("BRMS"), presentation validation, workflow process, dynamic endpoint selection, database system, authentication system, presentation authentication, reporting system and enterprise BRMS.

8. The method of claim 5 wherein the questions of the plurality of questions include at least one question at each of the following levels: (i) security; (ii) maintenance frequency/usage demand; (iii) complexity; and (iv) rule type.

9. A computer system for designing an a service oriented architecture ("SOA") system, the computer system comprising:
    a processor set;
    a user interface hardware set; and
    a software storage device;
    wherein:
    the software storage device stores SOA design tool software;
    the user interface hardware set is structured and/or connected in data communication to communicate data between a user and the SOA design tool hardware;
    the processor set is structured and/or connected in data communication to perform machine readable instructions of the SOA design tool hardware;
    the SOA design tool includes an SOA operational rules database, an SOA operational rules categories database and a question-based logic module;
    the SOA operational rules database stores a plurality of SOA operational rules;
    the SOA operational rules categories database stores a plurality of SOA operational rule categories and an indication of which SOA operational rules of the plurality of SOA operational rules correspond to each SOA operational rules category of the plurality of SOA operational rules categories; and
    the question-based logic module is programmed to: (i) present the user with a plurality of questions, through the user interface hardware set, with regard to a SOA operational rule, wherein at least one question of the plurality of questions comprises whether the SOA operational rule changes frequently, (ii) to receive a plurality of answers from the user respectively in response to the plurality of questions, (iii) to categorize the SOA operational rule into at least a SOA operational rule category, from the plurality of SOA operational rule categories, based at least in part upon answers received from the user, wherein when an answer is false to the question comprising whether the SOA operational rule changes frequently, the question-based logic module is programmed to present a question comprising whether the SOA operational rule requires validation of user input to the user prior to categorizing, and wherein when an answer is true to the question comprising whether the SOA operational rule changes frequently, the question-based logic module is programmed to present a question comprising whether the SOA operational rule is used frequently to the user prior to categorizing, and (iv) store, in the SOA operational rules database, information indicating that the SOA operational rule is associated with at least the SOA operational rule category.

10. The system of claim 9 wherein the question-based logic module is further programmed to categorize the SOA operational rule into at least a SOA operational rule category, from the plurality of SOA operational rule categories, based exclusively upon answers received from the user.

11. The system of claim 9 wherein the question-based logic module is further programmed to categorize the SOA operational rule into only the SOA operational rule category.

12. The system of claim 9 wherein each of the plurality of SOA operational rule categories respectively corresponds to an SOA component into which rules may be implemented.

13. The system of claim 12 wherein the SOA design tool software further comprises an SOA operational rules implementation module programmed to allow the user to implement the SOA operational rule into an SOA system in a component of the SOA system corresponding to the SOA operational rule category.

14. The system of claim 12 wherein the SOA operational categories include the following: local: local business rule management system ("BRMS"), presentation validation, workflow process, dynamic endpoint selection, database system, authentication system, presentation authentication, reporting system and enterprise BRMS.

15. The system of claim 12 wherein the questions of the plurality of questions include at least one question at each of the following levels: (i) security; (ii) maintenance frequency/usage demand; (iii) complexity; and (iv) rule type.

16. A computer readable storage medium that stores service oriented architecture ("SOA") design tool software, the SOA design tool comprising:
  an SOA operational rules database;
  an SOA operational rules categories database; and
  a question-based logic module;
  wherein:
    the SOA operational rules database stores a plurality of SOA operational rules;
    the SOA operational rules categories database stores a plurality of SOA operational rule categories and an indication of which SOA operational rules of the plurality of SOA operational rules correspond to each SOA operational rules category of the plurality of SOA operational rules categories; and
    the question-based logic module is programmed to: (i) present a user with a plurality of questions, through the user interface hardware set, with regard to a SOA operational rule, wherein at least one question of the plurality of questions comprises whether the SOA operational rule changes frequently, (ii) to receive a plurality of answers from the user respectively in response to the plurality of questions, (iii) to categorize the SOA operational rule into at least a SOA operational rule category, from the plurality of SOA operational rule categories, based at least in part upon answers received from the user, wherein when an answer is false to the question comprising whether the SOA operational rule changes frequently, the question-based logic module is programmed to present a question comprising whether the SOA operational rule requires validation of user input to the user prior to categorizing, and wherein when an answer is true to the question comprising whether the SOA operational rule changes frequently, the question-based logic module is programmed to present a question comprising whether the SOA operational rule is used frequently to the user prior to categorizing, and (iv) store, in the SOA operational rules database, information indicating that the SOA operational rule is associated with at least the SOA operational rule category.

17. The computer readable storage medium of claim 16 wherein each of the plurality of SOA operational rule categories respectively corresponds to an SOA component into which rules may be implemented.

18. The computer readable storage medium of claim 17 wherein the SOA design tool software further comprises an SOA operational rules implementation module programmed to allow the user to implement the SOA operational rule into an SOA system in a component of the SOA system corresponding to the SOA operational rule category.

19. The computer readable storage medium of claim 17 wherein the SOA operational categories include the following: local: local business rule management system ("BRMS"), presentation validation, workflow process, dynamic endpoint selection, database system, authentication system, presentation authentication, reporting system and enterprise BRMS.

20. The computer readable storage medium of claim 17 wherein the questions of the plurality of questions include at least one question at each of the following levels: (i) security; (ii) maintenance frequency/usage demand; (iii) complexity; and (iv) rule type.

* * * * *